United States Patent
Lo et al.

(10) Patent No.: US 10,152,616 B2
(45) Date of Patent: Dec. 11, 2018

(54) CARD WITH ELECTRICALLY CONDUCTIVE POINTS THAT ARE READABLE

(71) Applicant: Kazoo Technology (Hong Kong) Limited, Hong Kong (CN)

(72) Inventors: Kin Chung Kendall Lo, Hong Kong (CN); Pak Tao Alan Lau, Hong Kong (CN)

(73) Assignee: KAZOO TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 15/630,955

(22) Filed: Jun. 23, 2017

(65) Prior Publication Data
US 2018/0211071 A1    Jul. 26, 2018

Related U.S. Application Data

(63) Continuation-in-part of application No. 15/413,437, filed on Jan. 24, 2017, now Pat. No. 9,715,687.

(51) Int. Cl.
| | |
|---|---|
| *G06K 7/06* | (2006.01) |
| *G06K 7/08* | (2006.01) |
| *G06F 3/041* | (2006.01) |
| *G06F 3/044* | (2006.01) |
| *G06K 19/067* | (2006.01) |

(52) U.S. Cl.
CPC .............. *G06K 7/081* (2013.01); *G06F 3/044* (2013.01); *G06F 3/0418* (2013.01); *G06K 19/067* (2013.01); *G06F 2203/04104* (2013.01)

(58) Field of Classification Search
CPC ............ G06K 7/06; G06K 5/00; G06K 19/00; G06K 19/06; G06F 17/00
USPC .......................... 235/441, 380, 375, 487, 492
See application file for complete search history.

(56) References Cited

U.S. PATENT DOCUMENTS

| | | | |
|---|---|---|---|
| 2009/0071694 A1 | 3/2009 | Pawel | |
| 2015/0302226 A1* | 10/2015 | Li | G06K 19/07749 235/451 |

FOREIGN PATENT DOCUMENTS

| | | |
|---|---|---|
| CN | 103250164 A | 8/2013 |
| CN | 104267863 A | 1/2015 |
| WO | 2012072648 A | 6/2012 |

* cited by examiner

*Primary Examiner* — Edwyn Labaze
(74) *Attorney, Agent, or Firm* — Eagle IP Limited; Jacqueline C. Lui

(57) ABSTRACT

A card that includes an electrically non-conductive substrate and a plurality of conductive points disposed on a bottom surface of the non-conductive substrate. The conductive points are connected with a coupling point disposed on a top surface of the substrate through vias that extend through the substrate. The conductive points form a pattern that represents an identification of the card and activate locations on a touchscreen of an electronic device. At least three of the conductive points form a predetermined shape such that the electronic device determines a location and an orientation of the card when the card is placed on the touchscreen of the electronic device.

20 Claims, 12 Drawing Sheets

| Datawords | Codewords | Datawords | Codewords |
|---|---|---|---|
| 0000 | 0000000 | 1000 | 1000110 |
| 0001 | 0001101 | 1001 | 1001011 |
| 0010 | 0010111 | 1010 | 1010001 |
| 0011 | 0011010 | 1011 | 1011100 |
| 0100 | 0100011 | 1100 | 1100101 |
| 0101 | 0101110 | 1101 | 1101000 |
| 0110 | 0110100 | 1110 | 1110010 |
| 0111 | 0111001 | 1111 | 1111111 |

CARD WITH ELECTRICALLY CONDUCTIVE POINTS THAT ARE READABLE

FIELD OF THE INVENTION

The present invention relates to a method and system that includes a substrate with electrically conductive patterns that are readable with a touchscreen display.

BACKGROUND

There have been developments in storing and transmitting information via capacitive coupling between electronic cards and electronic devices with touchscreens. Information transmits from the card to the electronic device when the card is placed in contact with the touchscreen.

New methods and apparatus that store and transmit information via capacitive coupling will assist in advancing technological needs and solving technological problems.

SUMMARY OF THE INVENTION

Figure 1A:
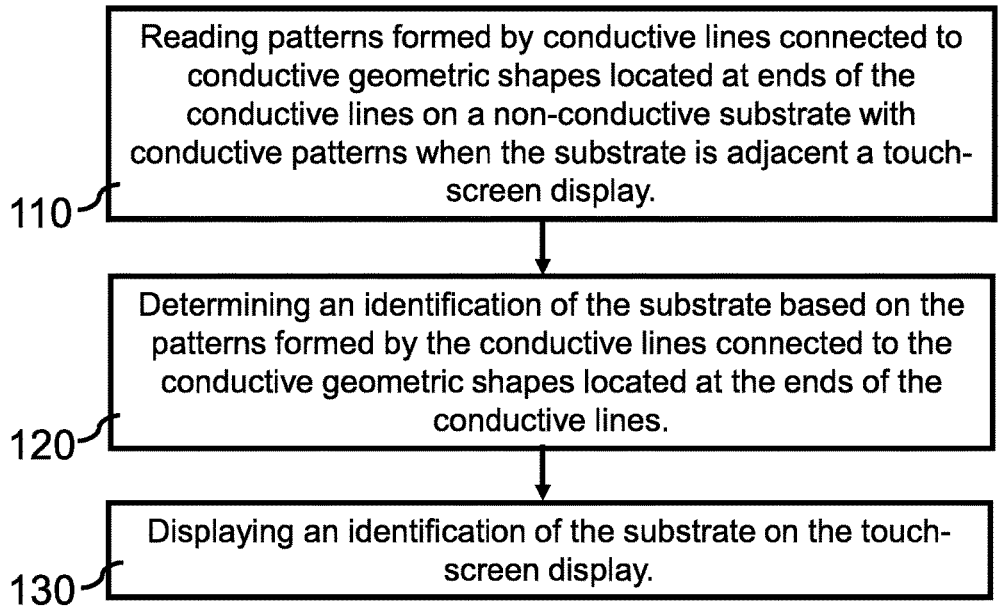
FIG. 1A shows a method executed by a reader to determine an identification of a substrate with conductive patterns in accordance with an example embodiment.

One example embodiment is a card that includes an electrically non-conductive substrate and a plurality of conductive points disposed on a bottom surface of the non-conductive substrate. The conductive points are connected with a coupling point disposed on a top surface of the substrate through vias that extend through the substrate. The conductive points form a pattern that represents an identification of the card and activate locations on a touchscreen of an electronic device. At least three of the conductive points form a predetermined shape such that the electronic device determines a location and an orientation of the card when the card is placed on the touchscreen of the electronic device.

Other example embodiments are discussed herein.

DETAILED DESCRIPTION

Example embodiments relate to apparatus and methods to determine information on a substrate with conductive patterns. The substrate includes one or more switches that turn on and off to change patterns of conductive areas that are readable by a capacitive touchscreen.

Touchscreen devices are in electronic devices such as game consoles, personal computers, tablet computers, electronic voting machines, and smartphones. These touchscreen devices can read information embedded in patterns formed on a nonconductive substrate of an example embodiment. This substrate includes one or more switches that can be activated and deactivated to change the patterns formed on the substrate and in turn change or alter information stored on the substrate.

The substrate of example embodiments includes various shapes and can be embodied or included with various types of electronic and non-electronic devices. By way of example, the substrate can be shaped as a flat or planar card, such as a business card, credit card, gaming card, or other handheld card. As another example, the substrate can be included with or embedded in product, such as embedded in a smartphone, embedded in a toy, attached to a cover or case, woven into a fabric of an article of manufacture, etc. As yet another example, the substrate can have various sizes and shapes, such as being curved or bent or foldable. A size and shape of the substrate can also vary depending on, for example, the number and type of switches, the amount of information being stored and/or transmitted, a location where the substrate will be used, whether the substrate includes a processor or controller, etc.

In an example embodiment, the substrate is embedded with electrical conductors that form touch points to simulate fingertips of a user touching a capacitive touchscreen. The touch points function as information carriers that can be read by the touchscreen and electronic devices with a touchscreen. By way of example, the substrate of example embodiments can be used in many fields, such as gaming, ticketing, member identifications, counterfeit protections, and other technological fields.

An example embodiment includes a non-conductive substrate with a plurality of electrical conductors and switches disposed on or in the non-conductive substrate. The electrical conductors are connected together to form patterns of conductive lines and conductive geometric shapes. These geometric shapes functions as touch points that activate locations on a capacitive touchscreen. The geometric shapes or touch points can be located at ends of the conductive lines or along the conductive lines.

Some capacitive touchscreens include an insulator (such as glass) that is coated with a transparent conductor. When an electrical conductor touches or comes close to the surface of the screen, an electrostatic field of the screen distorts and generates a measurable change in capacitance. A location of this change in capacitance is sent to a controller for processing.

The conductor on the touchscreen can be a human finger or other conductor, such as the geometric shapes or touch points located on the non-conductive substrate of an example embodiment. When the substrate touches or comes near the touchscreen, a capacitor is formed at each of the locations of the geometric shapes or touch points that are located on or in the substrate. These touch points emulate or simulate a person touching or otherwise activating the location on the touchscreen. The controller or processor in the electronic device determines the location of these shapes or points from a change in capacitances or change in voltage as measured from locations on the touchscreen, such as the corners or sides of the touchscreen. For example, each geometric shape or touch point generates a capacitor at a location formed by a row trace and a column trace of the touchscreen. A number of capacitive X-Y grid locations or intersections on the touchscreen can vary, depending on the type and size of the touchscreen.

In an example embodiment, one or more switches are positioned on or in electrical communication with the conductive lines and the touch points. The switches are switchable between an open position or state and a closed position or state. The switches can change or alter a configuration of a geometric patterned formed by the conductive lines and touch points and read by the touchscreen. The switches can also turn touch points on (e.g., when a switch connected to a touch point is in a closed position) and turn touch points off (e.g., when a switch connected to a touch point is in an open position).

The conductive geometric shapes or touch points can have various shapes, including but not limited to, one or more of a square, a circle, a triangle, a star and other polygon shapes. In an example embodiment, the touch point has a circular shape with a diameter of more than 0.4 centimeters, which allows a sufficient area to couple with the touchscreen device. In another example embodiment, the touch point has a diameter smaller than 0.4 centimeters, such as being a smaller circle or formed at an intersection of two conductive lines. For instance, the touch point has a diameter of 0.3 centimeters or greater, 0.2 centimeters or greater, or 0.1 centimeters or greater. As yet another example, a touch point occurs where two conductive lines cross. Further one of ordinary skilled in the art will appreciate that these example dimensions apply to circles and other shapes, such as triangles, squares, pentagons, ovals, ellipses, and other polygonal shapes and non-polygonal shapes.

The conductive lines and the touch points form a pattern that corresponds to a unique identification of the substrate. The pattern is changeable when one or more switches switch between the open state and the closed state. A user or electronic device is thus able to change an identity or information stored on a substrate by turning on and off one or more switches. Each unique pattern or switching configuration on the substrate can be associated with a unique identity or particular information. The switches can also be activated and deactivated (e.g., with a processor or controller located on the substrate) to transmit information to the touchscreen, such as transmitting bits, bytes, or blocks of data.

A number of unique patterns or configurations depends on a number of conductive lines and touch points. Consider an example in which a planar card has three touch points A, B and C with a conductive line disposed between A and B, and a conductive line disposed between B and C. Two switches P and Q are disposed on the two conductive lines, respectively. Switch P is placed between A and B, and switch Q is placed between B and C. By turning switch P and Q on and off, a total of four patterns can be formed by this configuration. One of ordinary skill in the art will appreciate that the number of patterns can vary depending on various factors, such as the number of switches, the configuration of the switches, the number of conductive lines, the number of touch points, and other factors.

FIG. 1A shows a method executed by an electronic device or reader with a touchscreen that determines an identification of a non-conductive substrate with conductive patterns.

Block 110 states reading patterns formed by conductive lines connected to conductive geometric shapes located at ends of the conductive lines on a non-conductive substrate when the substrate is adjacent a touchscreen.

Consider an example in which a planar card includes the non-conductive substrate with a plurality of switches that can be turned on and off to alter conductive patterns formed on the substrate. When the card is located on or near a touchscreen, the patterns on card activate locations on the touchscreen. Activation of these locations provides information to an electronic device that includes the touchscreen or that is in communication with it. The patterns formed on the card include one or more switches that are positioned between the conductive geometric shapes and are switchable between an open state and a closed state.

In one example embodiment, the switches include, but are not limited to, one or more of bipolar junction transistors (BJT), field effect transistors (FET), micro-electromechanical system (MEMS), optoelectronic switches, digital or mechanical relays, and any other switch mechanism that enables and disables electric current or voltage flow. As one example, the optoelectronic switch turns on or off when a ray of light is incident on the switch such that the two touch points located at ends of the conductive line are connected or disconnected to each other.

By way of example, open and closed states of each switch represent different patterns of the substrate. Each pattern corresponds to a unique identification of the substrate. Consider an example in which the substrate is a handheld portable card. The card is programmable to include particular information (such as information stored and retrieved in response to reading an identity of the card), certain rights or privileges (such as access rights or access privileges to an electronic device), user authentication, etc. By changing the pattern through the switches, more than one identification or unique set of information can be stored in or associated with the same card. A single card can thus have a higher data storing capacity.

In an example embodiment, additional data is stored in the substrate by switching the switches between on and off states in a specific time sequence. For example, turning on switch P followed by turning on switch Q corresponds to a different identification compared with turning on switch Q followed by turning on switch P.

Block 120 states determining an identification of the substrate based on the patterns formed by the conductive lines connected to the conductive geometric shapes located at the ends of the conductive lines.

As one example, the electric field at coordinates of the touchscreen display that are in contact with or adjacent to the conductive lines and the conductive geometric shapes is changed such that a pattern recognizer recognizes the pattern and determines the identification of the substrate.

Consider an example in which a geometric pattern of touch points on a card activates a plurality of X-Y grid locations on the touchscreen. A controller receives these activated grid locations and retrieves (e.g., from a lookup table or other memory) an identification of the card based on which grid locations were activated. This identification can also be based on which grid locations were not activated.

Block 130 states displaying an identification of the substrate on the touchscreen display.

Once the substrate is identified, the controller retrieves information associated with the identification. For instance, the touchscreen displays one or more images associated with the identification. As another example, the touchscreen activates, executes, or grants a user access to a software program associated with the identification. As another example, a monetary value stored on the substrate or associated with the substrate is displayed on the display in an instance in which the substrate is used for transactions involving payments of money, credits, or tokens such as payment as a credit card, payment as a near field communication (NFC) card, or payments for gaming applications. For instance, the substrate stores a unique number or identity that is associated to one or more monetary values stored on a server.

Figure 1B:
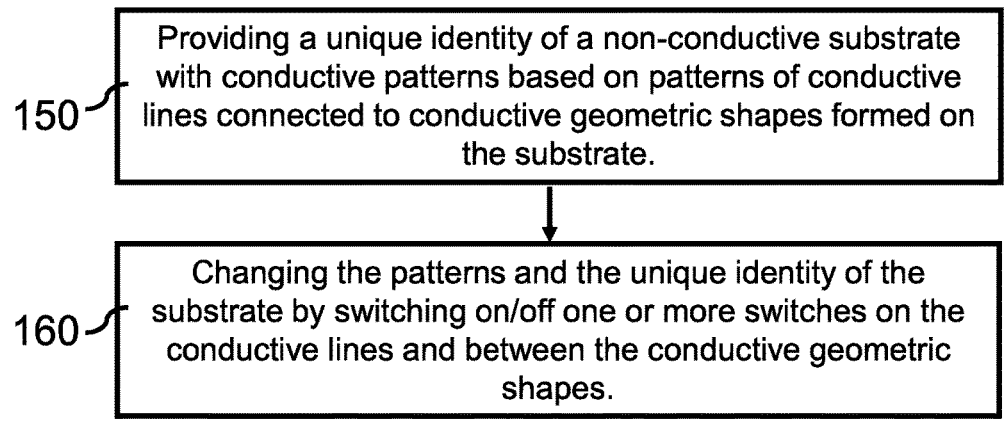
FIG. 1B shows a method to change geometric patterns on a substrate that is read by a capacitive touchscreen in accordance with an example embodiment.

FIG. 1B shows a method to change geometric patterns on a substrate that is read by a capacitive touchscreen.

Block 150 states providing a unique identity of a non-conductive substrate with conductive patterns based on patterns of conductive lines connected to conductive geometric shapes formed on the substrate.

As one example, a pattern recognizer in the touchscreen device compares the pattern that is read with pre-stored patterns in a database to determine the identity of the substrate.

Block 160 states changing the patterns and the unique identity of the substrate by switching on/off one or more switches on the conductive lines and between the conductive geometric shapes.

By way of example, each pattern corresponds to a unique identity of the substrate. The pattern is changeable when the switches switch between the open state and the closed state. For example, if a field effect transistor is used as the switch, the switching function will be done by changing the gate-source voltage.

Figure 2:
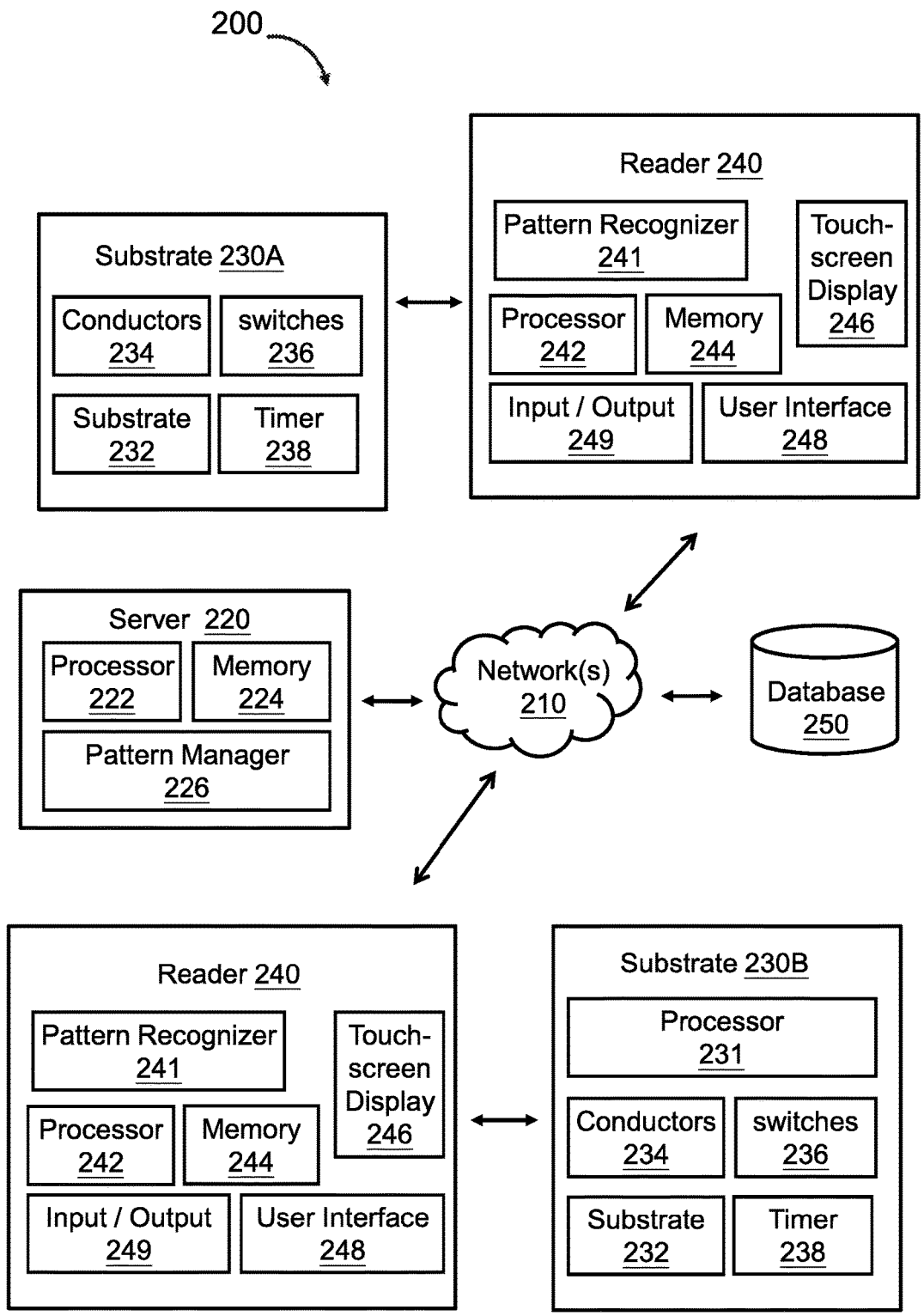
FIG. 2 shows an electronic system in accordance with an example embodiment.

FIG. 2 shows an electronic system 200 in accordance with an example embodiment. The electronic system 200 includes a server 220, a database 250, non-conductive substrates with conductive patterns 230A and 230B, and a reader 240. One or more elements in the electric system 200 can communicate with each other through one or more networks 210.

The networks 210 can include one or more of the internet, an intranet, an extranet, a cellular network, a local area network (LAN), a Wi-Fi network, a home area network (HAN), metropolitan area network (MAN), a wide area network (WAN), a Bluetooth network, public and private networks, etc.

The server 220 includes a processor 222 that communicates with a memory 224 and a pattern manager 226. By way of example, the processor 222 can be a microprocessor, central processing unit (CPU), or application-specific integrated circuit (ASIC) for controlling and/or receiving instructions or data from the memory 224 (such as random access memory (RAM), read only memory (ROM), and/or firmware). By way of example, the pattern manager stores a plurality of substrate patterns and/or information associated with unique identities of the substrates.

The non-conductive substrates with conductive patterns 230A and 230B each includes a substrate 232, a plurality of electrical conductors 234 disposed on a surface of the substrate, a plurality of switches 236 each positioned between two conductive geometric shapes and a timer 238. The conductors 234 are connected together to form patterns of conductive lines connected to conductive geometric shapes located at ends of the conductive lines. The switches 236 are switchable between an open state and a closed state. The substrate 230B further includes a processor 231 that communicates with the switches 236 and the timer 238.

By way of example, open and closed states of each switch represent different patterns of the substrate. In an example embodiment, additional data is stored in the substrate by switching the switches between on and off states in a specific time sequence.

In one example embodiment, an electronic timer records the duration of time that the substrate is located adjacent to the touchscreen display of the reader. The duration can be associated to the change of a specific valuation of the substrate, such as a monetary value and others relevant to the application concerned.

The reader 240 includes a controller or processor 242 that communicates with a pattern recognizer 241, a memory 244, a touchscreen display 246, a user interface 248 and an input/output (I/O) 249. By way of example, the pattern recognizer 241 reads the patterns formed on the surface of the substrate when the substrate is in contact with or adjacent to the touchscreen display 246. In an example embodiment, the user interface displays data or images associated with the card or applications authorized or executed upon reading the substrate.

Figure 3:
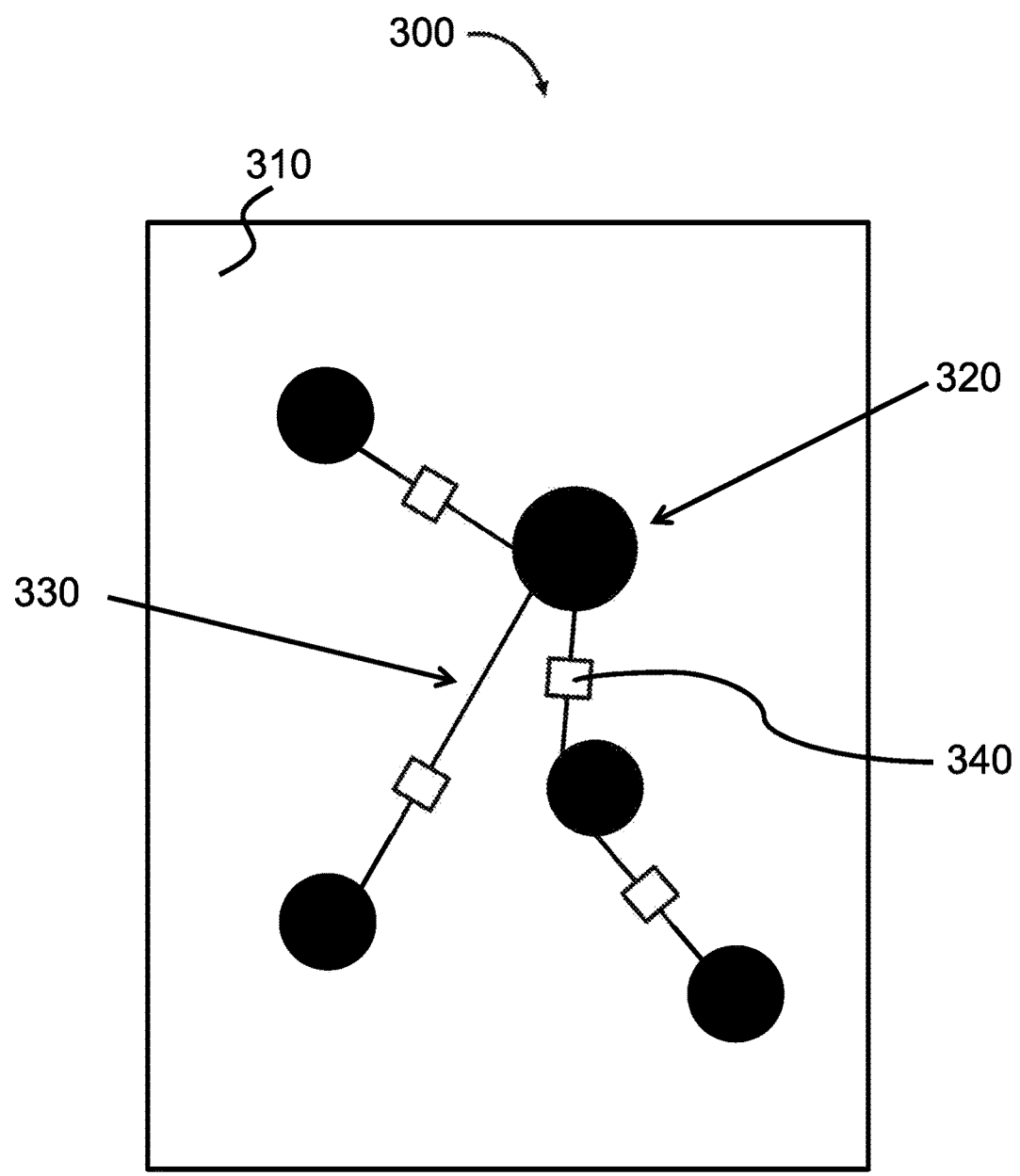
FIG. 3 shows a substrate with conductive patterns in accordance with an example embodiment.

FIG. 3 shows a non-conductive substrate with conductive patterns 300 in accordance with an example embodiment. The substrate 300 includes an electrically non-conductive substrate 310 and a plurality of electrical conductors disposed on a surface of the non-conductive substrate 310. The electrical conductors are connected together to form patterns of conductive lines 330 connected to conductive geometric shapes or touch points 320 located at ends of the conductive lines 330. A plurality of switches 340 are positioned between the conductive geometric shapes 320. The switches are switchable between an open state and a closed state.

As one example, the conductive lines and the conductive geometric shapes form a pattern that corresponds to a unique identification of the substrate. The pattern is changeable when the switches switch between the open state and the closed state. A number of unique identifications can increase by increasing a number of geometric shapes and/or switches.

As one example, when the substrate is placed against or adjacent a touchscreen display of a reader, the patterns formed on the substrate effect changes of an electric field at coordinates of the touchscreen display where the conductive lines and/or the conductive geometric shapes are located.

The pattern recognizer of the reader recognizes the pattern based on the change of the electric field.

Figure 4:
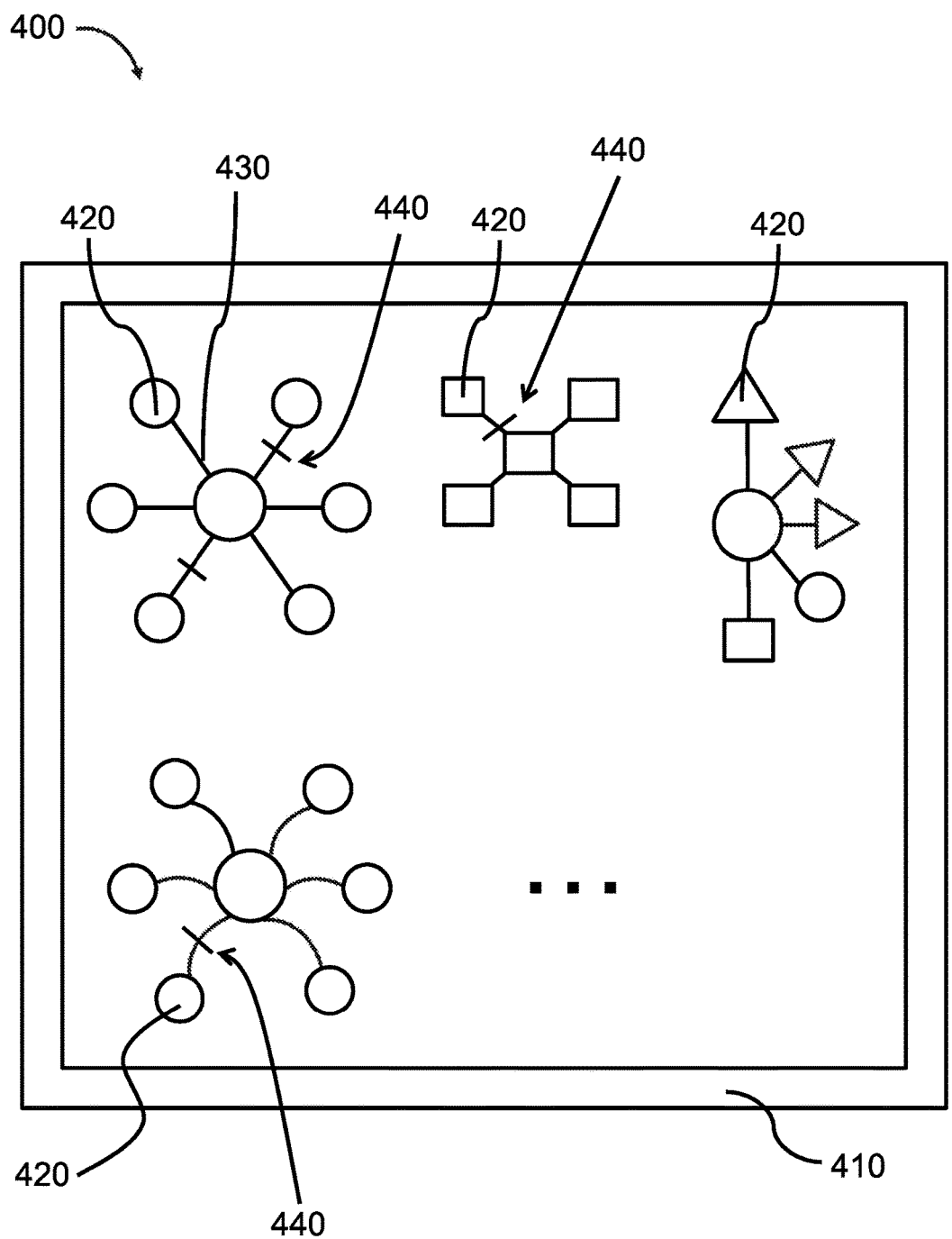
FIG. 4 shows a substrate with conductive patterns in accordance with another example embodiment.

FIG. 4 shows a non-conductive substrate with conductive patterns 400 in accordance with another example embodiment. The substrate 400 includes an electrically non-conductive substrate 410 and a plurality of electrical conductors disposed on a surface of the non-conductive substrate 410. The electrical conductors are connected together to form patterns of conductive lines 430 connected to conductive geometric shapes 420 located at ends of the conductive lines 430. A plurality of switches 440 are positioned between two of the conductive geometric shapes 420. As one example, the patterns have a star-shape, and a polygon-shape.

In an example embodiment, the electrical conductors are formed by a transfer foil process. An adhesive layer is partly applied to an electrically non-conductive substrate. After that, metal foil layers are applied via a transfer process to form patterns of conductive lines connected to conductive geometric shapes located at ends of the conductive lines on the substrate. Switches, for example, MEMS or optoelectronic switches are positioned between two of the geometric shapes by wire bonding or flip-chip bonding. At last, an electromagnetic interference shielding material is applied to reduce interference from external sources. The shielding material has sufficient mechanical robustness to withstand torsion and tension while maintaining its shielding properties.

In another example embodiment, the electrical conductors are formed by printing conductive ink on the electrically non-conductive substrate. The substrate is made of electrical non-conductive material that is preferably flexible and light weight, such as plastic, paper, card board, wood, glass, ceramics, fabrics, leather or a combination thereof. By way of example, the conductive ink is mixed with metal powers or metal flakes.

In another example embodiment, the electrical conductors are formed by applying a conductive sheet on the electrically non-conductive substrate followed by etching or laser process to remove unwanted areas. As one example, the unwanted areas are heated by the laser and evaporate, leaving the remaining areas to form a desired pattern.

Figure 5A:
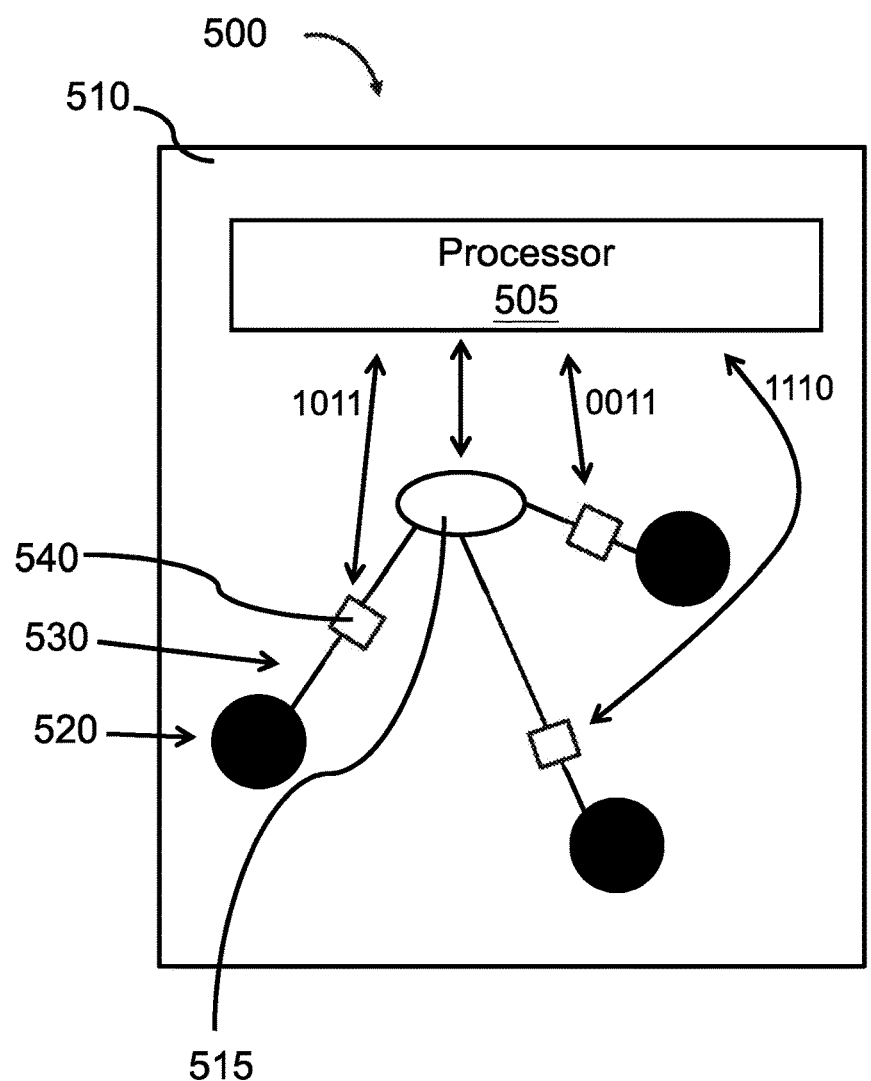
FIG. 5A shows a substrate with conductive patterns in accordance with an example embodiment.

FIG. 5A shows a non-conductive substrate with conductive patterns 500 in accordance with an example embodiment. The substrate 500 includes an electrically non-conductive substrate 510 and a plurality of electrical conductors disposed on a surface of the non-conductive substrate 510. The electrical conductors are connected together to form patterns of conductive lines 530 connected to conductive geometric shapes or touch points 520 located at ends of the conductive lines 530.

A coupling point 515 is disposed on the substrate 510 and is connected to the conductive lines 530. A plurality of switches 540 are positioned on each of the conductive lines and between the conductive geometric shapes 520 and the coupling point 515. The substrate 500 further includes a processor 505 that communicates with the switches 540 and the coupling point 515. The processor 505 can be powered by a built-in battery or through inductance. The switches are switchable between an open state and a closed state and are encoded by the processor 505. For example, the switches shown in FIG. 5A are encoded as "1011", "0011", and "1110".

In an example embodiment, the coupling point is located on an opposite side to the conductive geometric shapes. In another example embodiment, the coupling point is located on a same side as the conductive geometric shapes. The switches and the processor can be located on either side of the substrate or both sides of the substrate.

As one example, when a user places the substrate against or near a touchscreen display and places his/her finger on the coupling point of the substrate, the patterns formed on the substrate effect changes of an electric field at coordinates of the touchscreen display where the conductive lines and/or the conductive geometric shapes are located. In one example embodiment, the reader decodes the pattern of the substrate and generates readable data.

Figure 5B:
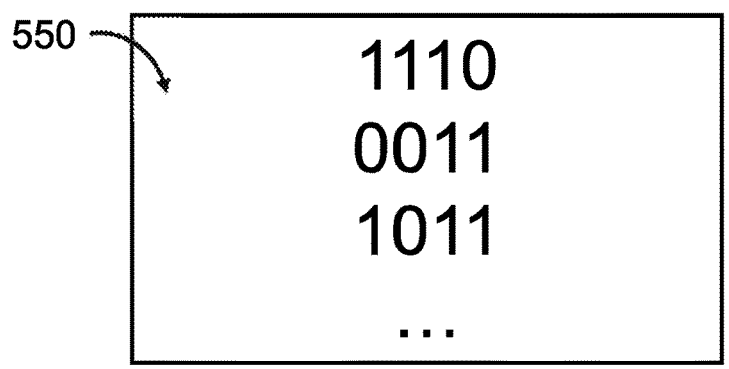
FIG. 5B shows a table that is decoded by a reader in accordance with an example embodiment.

By way of example, this readable data is shown as a table 550 as shown in FIG. 5B. One skilled in the art will appreciate that the data can be provided, stored, transmitted in various forms, and the table is provided as an illustration of the substrate providing readable data.

In one example embodiment, the substrate can attach to or be formed with an article, such as a smartphone or a business card or the article itself serves as a substrate. Further, example embodiments are not limited to a particular size or shape of substrate. For example, the substrate can be provided on or in handheld portable devices and integrated into electronic devices or non-electronic devices.

Figure 6:
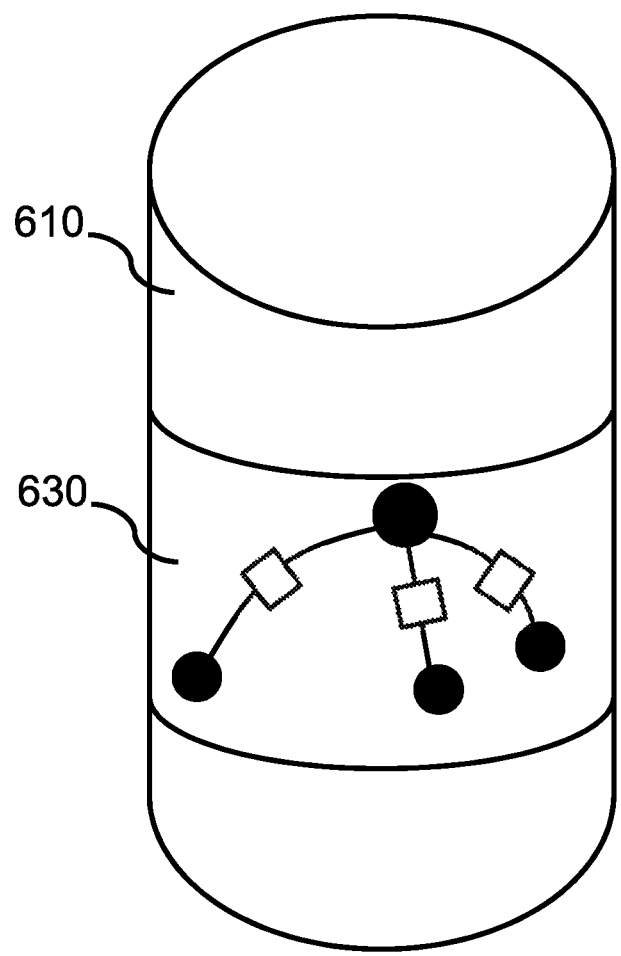
FIG. 6 shows a curved substrate with conductive patterns attached to a surface of an article in accordance with an example embodiment.

FIG. 6 shows an example of a curved non-conductive substrate with conductive patterns 630 attached to a surface of a cylinder-shaped article 610 in accordance with an example embodiment. The substrate 630 is flexible and may or may not be detachable from the article 610 and wraps partially around an exterior surface of the cylinder As one example, a smartphone includes a substrate of an example embodiment. As another example, a case or cover to a smartphone or other portable electronic device includes an example embodiment.

Figure 7:
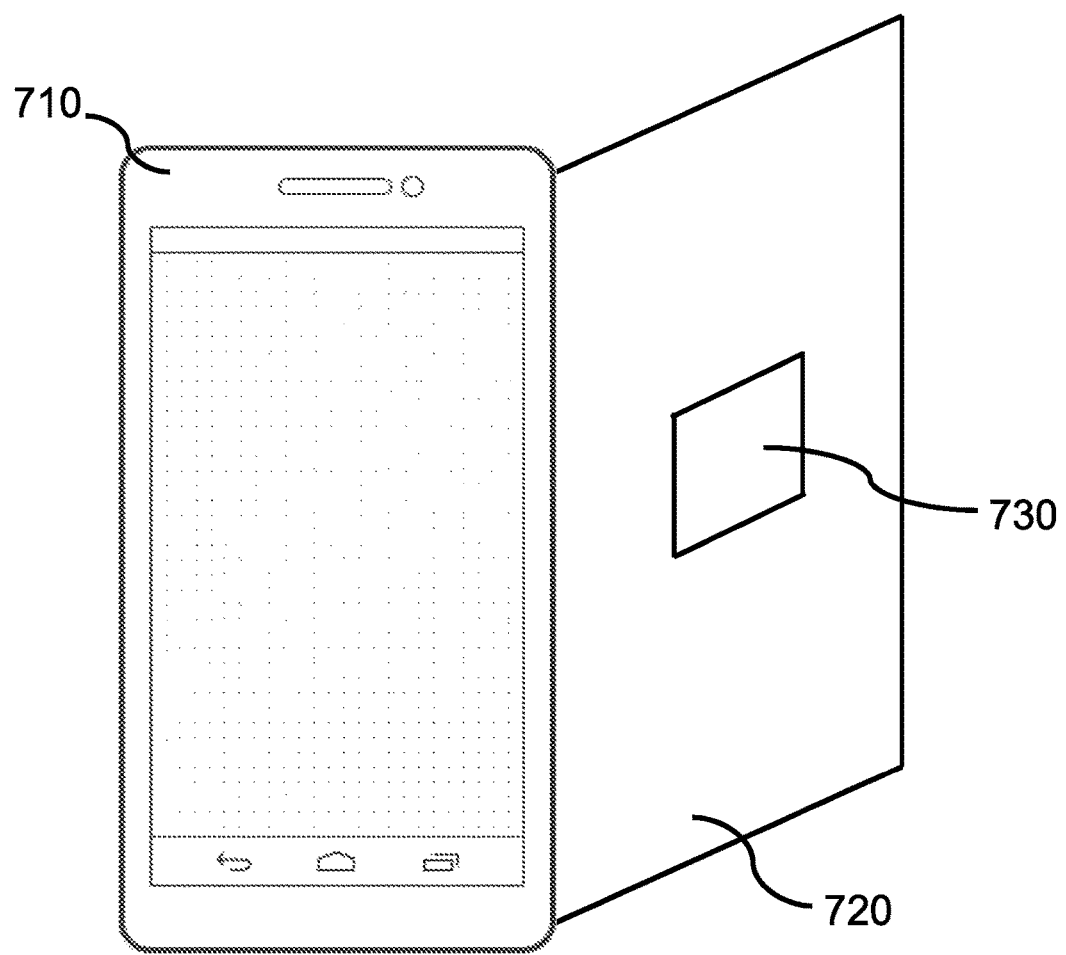
FIG. 7 shows a substrate with conductive patterns attached to a cover of a smartphone in accordance with an example embodiment.

FIG. 7 shows a smartphone 710 with a non-conductive substrate 730 in accordance with an example embodiment. By way of illustration, the substrate 730 is connected to or formed in a removable cover 720 that fits around the smartphone 710.

A substrate of example embodiments can be integrally formed into or with another device or removable or detachable from the device.

Figure 8A:
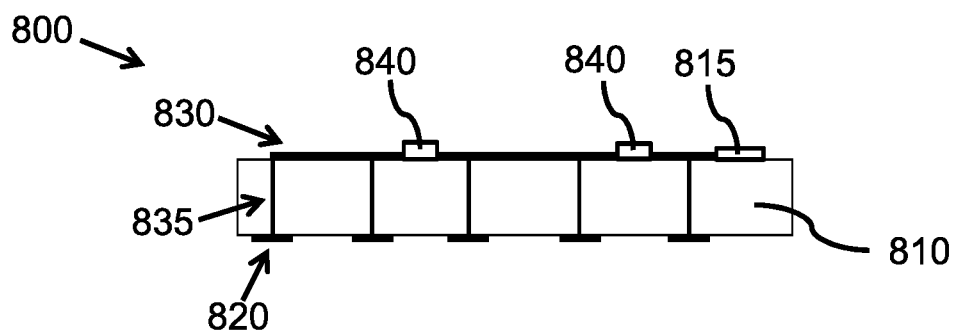
FIG. 8A shows a cross sectional view of a substrate with conductive patterns in accordance with an example embodiment.
Figure 8B:
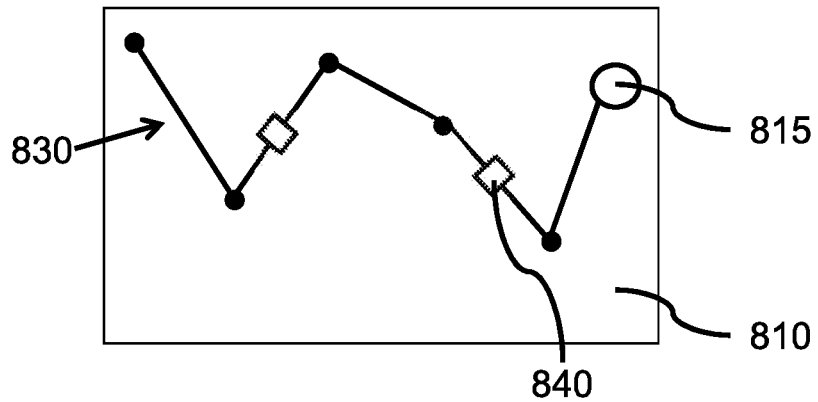
FIG. 8B shows a top view of a substrate with conductive patterns in accordance with an example embodiment.
Figure 8C:
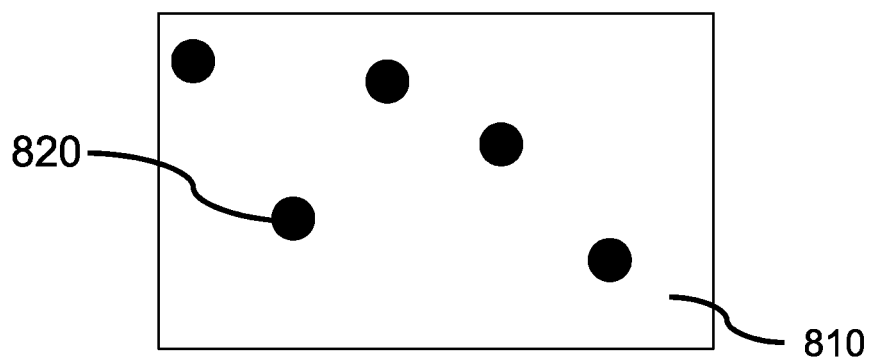
FIG. 8C shows a bottom view of a substrate with conductive patterns in accordance with an example embodiment.

FIG. 8A shows a cross sectional view of a non-conductive substrate with conductive patterns 800 in accordance with an example embodiment. FIG. 8B shows a top view of the substrate shown in FIG. 8A. FIG. 8C shows a bottom view of the substrate shown in FIG. 8A.

The substrate 800 includes an electrically non-conductive substrate 810 and a plurality of electrical conductors that are disposed on a top surface of the non-conductive substrate 810, on a bottom surface of the non-conductive substrate and inside the non-conductive substrate. The electrical conductors include a plurality of conductive geometric shapes 820 disposed on the bottom surface of the substrate, conductive lines 830 disposed on the top surface of the substrate and conductive vias 835 embedded inside the substrate.

One or more coupling points can be disposed on the surface of the substrate. For example, a coupling point 815 is disposed on the top surface of the substrate and is connected to the conductive lines 830. The conductive geometric shapes are connected to each other through the conductive vias or electrically conductive pathways 835 and the conductive lines 830. A plurality of switches 840 are positioned on the conductive lines on the top surface of the substrate. The switches are switchable between an open state and a closed state.

As one example, when a user places the substrate against or near a touchscreen display, information transmits from the substrate as the conductive shapes 820 activate and deactivate. For instance, when a user places his/her finger on the coupling point of the substrate to activate information transmission between the substrate and the touchscreen display, the geometric shapes formed on the bottom surface of the substrate effect changes of an electric field at coordinates of the touchscreen display where the conductive geometric shapes are located.

Example embodiments relate to apparatus and methods to obtain information from a card that carries the information in a pattern formed by a plurality of conductive points that are electrically connected with a coupling point through conductive lines and vias. When a user places the card on a touchscreen of an electronic device or a reader and contacts the coupling point with a finger, the electronic device obtains identification of the card based on locations of the conductive points and determines a location and an orientation of the card relative to the reader.

An example embodiment includes a card that includes an electrically non-conductive substrate and a plurality of conductive points disposed on a bottom surface of the non-conductive substrate. The conductive points are connected with a coupling point that is disposed on a top surface of the substrate through vias that extend through the substrate. The conductive points form a pattern that represents an identification of the card and activate locations on a touchscreen of an electronic device or a reader when the card is placed on the touchscreen of the electronic device and a user contacts the coupling point with a finger.

The conductive points that are connected with the coupling point form a pattern that represents an identification of the card. The pattern is changeable when one or more of the conductive points disconnect from the coupling point. The identification of the card is changed when the pattern formed by the conductive points is changed.

The pattern formed by the conductive points can have various shapes, including but not limited to, one or more of a square, a circle, a triangle, a star and other polygon shapes. In an example embodiment, the conductive point has a shape to allow a sufficient area to couple with the touchscreen device. In one example embodiment, the conductive point has a circular shape. In another example embodiment, the conductive point is formed at an intersection of two conductive lines. One of ordinary skilled in the art will appreciate that these examples apply to other shapes, such as triangles, squares, pentagons, ovals, ellipses, and other polygonal shapes and non-polygonal shapes.

In one embodiment for example, three of the conductive points form a triangle to function as anchor points for the card. When the card is placed on a touchscreen or a touch surface of a reader, for example, a tablet or a surface that is coated with electrically conductive materials, the reader detects locations of the conductive points and determines a location and an orientation of the card based on locations of the anchor points.

In one embodiment for example, when the reader attempts to locate the anchor points that form a specific triangular shape, the reader may read two triangles with the same size but at two difference locations. The reader determines which triangle is formed by the anchor points on the card by comparing a number of conductive points that are located inside a boundary of a size of the card. The triangle with more conductive points inside the boundary of the size of the card is determined to be formed by the anchor points, and the location and orientation of the card are determined based on the anchor points.

In one example embodiment, a touchscreen device functions as a reader to read an electronic device or a card that is located on the touchscreen. The reader reads the patterns that are formed by conductive points on the cards and determines a location and an orientation of the card relative to the reader based on locations of three of the conductive points that form a triangular shape. As one example, the location and the orientation of the card is displayed on the touchscreen in a form of a boundary of the card. The reader further determines and displays the identification of the card based on activated locations on the touchscreen of the reader that are activated by the conductive points of the card.

In one example embodiment, the reader corrects a falsely detected location on the touchscreen of the reader when the falsely detected location is activated by none of the conductive points on the card. The reader executes a correction algorithm stored in its processor to determine whether a detected location on the touchscreen is false. The determination is made by checking whether a group of predetermined locations on the touchscreen of the reader detect conductive points from the card.

Figure 9A:
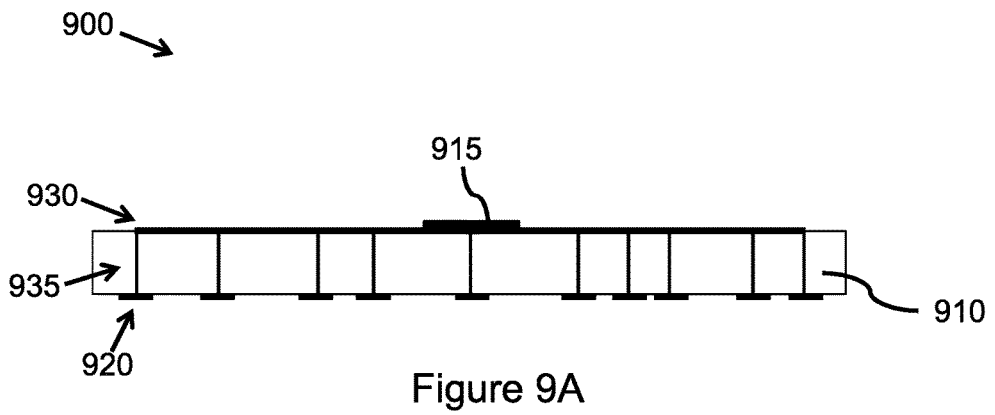
FIG. 9A shows a cross sectional view of a card with conductive points in accordance with an example embodiment.
Figure 9B:
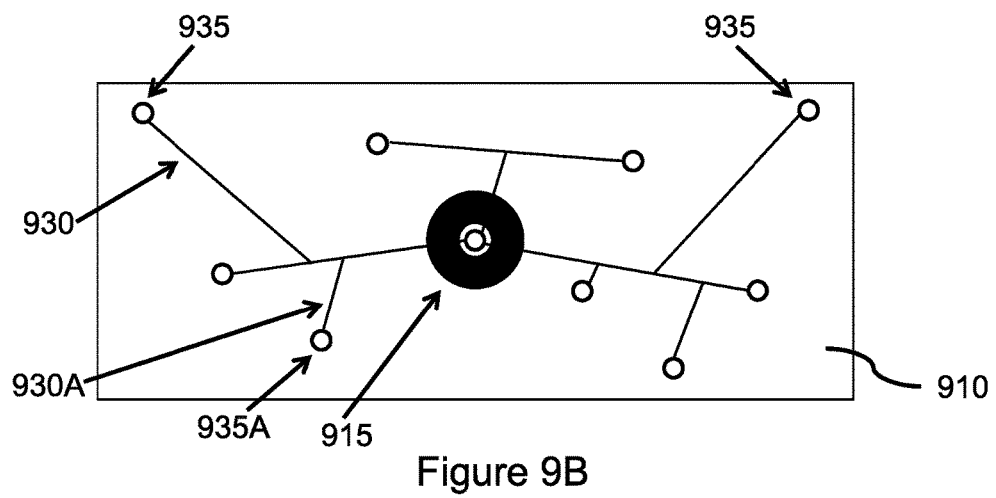
FIG. 9B shows a top view of a card with conductive points in accordance with an example embodiment.
Figure 9C:
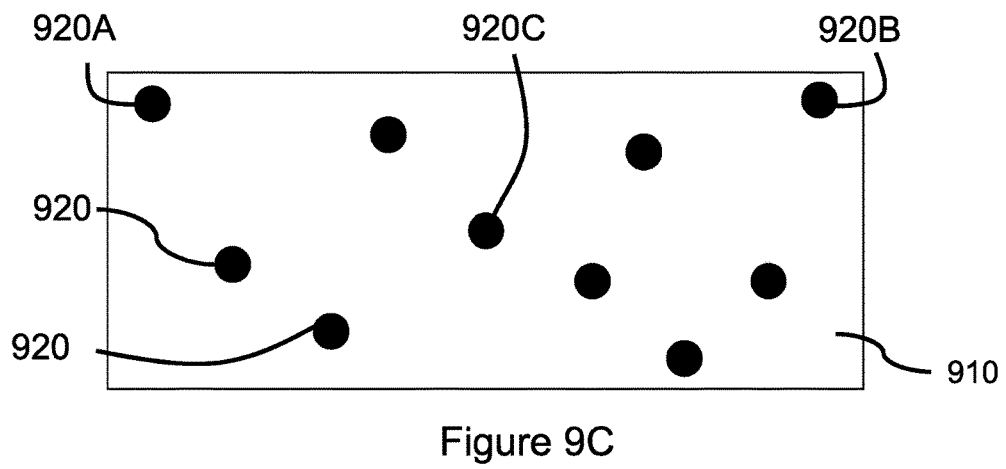
FIG. 9C shows a bottom view of a card with conductive points in accordance with an example embodiment.

FIG. 9A shows a cross sectional view of a card 900 with conductive points in accordance with an example embodiment. FIG. 9B shows a top view of the card shown in FIG. 9A. FIG. 9C shows a bottom view of the card shown in FIG. 9A.

The card 900 includes a non-conductive substrate 910, a plurality of conductive lines 930 on a top surface of the non-conductive substrate 910, a coupling point 915 on the top surface of the non-conductive substrate 910, a plurality of vias or electrically conductive pathways 935 that extend through the non-conductive substrate 910 from the top surface to the bottom surface, and a plurality of conductive points 920 on a bottom surface of the non-conductive substrate 910.

One or more coupling points can be disposed on the top surface of the substrate. Further, the coupling points can be disposed at different locations on the top surface. By way of example, FIG. 9B shows a coupling point 915 in a center of the card as seen from a top view.

Coupling point 915 is disposed on the top surface of the substrate and is connected to the conductive lines 930. Each of the conductive lines has a first end that is electrically connected with the coupling point 915, and a second end that is connected with one of the vias 935. The conductive points 920 on the bottom surface of the substrate are connected to and electrically coupled to the coupling point 915 through electrically conductive vias 935 and conductive lines 930.

As one example, the conductive points activate locations on a touchscreen or a touch surface of a device when a user places the card on the touchscreen with the bottom surface of the card facing the touchscreen. When the user contacts the coupling point on the card with a finger or another object that holds an electrical charge, the coupling point activates information transmission between the card and the electronic device. For example, the pattern formed by the conductive points on the bottom surface of the card effect changes of an electric field at coordinates of the touchscreen where the conductive points are located. As another example, the electric field at coordinates of the touchscreen that are adjacent to the conductive points is changed such that a pattern recognizer of the electronic device recognizes the pattern and determines the identification of the substrate. By way of example, the conductive points actuate a voltage drop or change in electrical current at points on the touchscreen that are at the conductive points.

The conductive points that are connected with the coupling point form a pattern that represents an identification of the card. The pattern is changeable when one or more of the conductive points disconnect from the coupling point. For example, breaking or electrically shorting one of the conductive lines that connects one of the conductive points with the coupling point leads to a disconnection of the corresponding conductive point from the coupling point. The identification of the card is therefore changed when the pattern formed by the conductive points is changed.

By way of example, the pattern formed by the conductive points can have various shapes, including but not limited to, one or more of a square, a circle, a triangle, a star and other polygon shapes. A card can exhibit one or more of these shapes through activation of different sequences of the conductive points. For example, when a first group of conductive points are electrically coupled, then the card activates a triangular pattern on the touchscreen. When a second group of conductive points are electrically coupled, then the card activates a shape that is different than the triangle, such as a square, a circle, a larger or smaller triangle, multiple objects, another polygon, or other shape.

In an example embodiment, the coupling point and the conductive points have a circular shape. One of ordinary skilled in the art will appreciate that the conductive points have other shapes, such as triangles, squares, pentagons, ovals, ellipses, and other polygonal shapes and non-polygonal shapes.

As shown in FIG. 9C for example, three of the conductive points 920A, 920B and 920C form a triangle to function as anchor points for the card. When the card is placed on a touchscreen device, the touchscreen device detects locations of the three anchor points and determines a location and an orientation of the card based on the locations of the three anchor points. One of ordinary skilled in the art will appreciate that more than three conductive points can function as anchor points for the card, by forming other shapes such as squares, pentagons, and other polygonal shapes.

Figure 10:
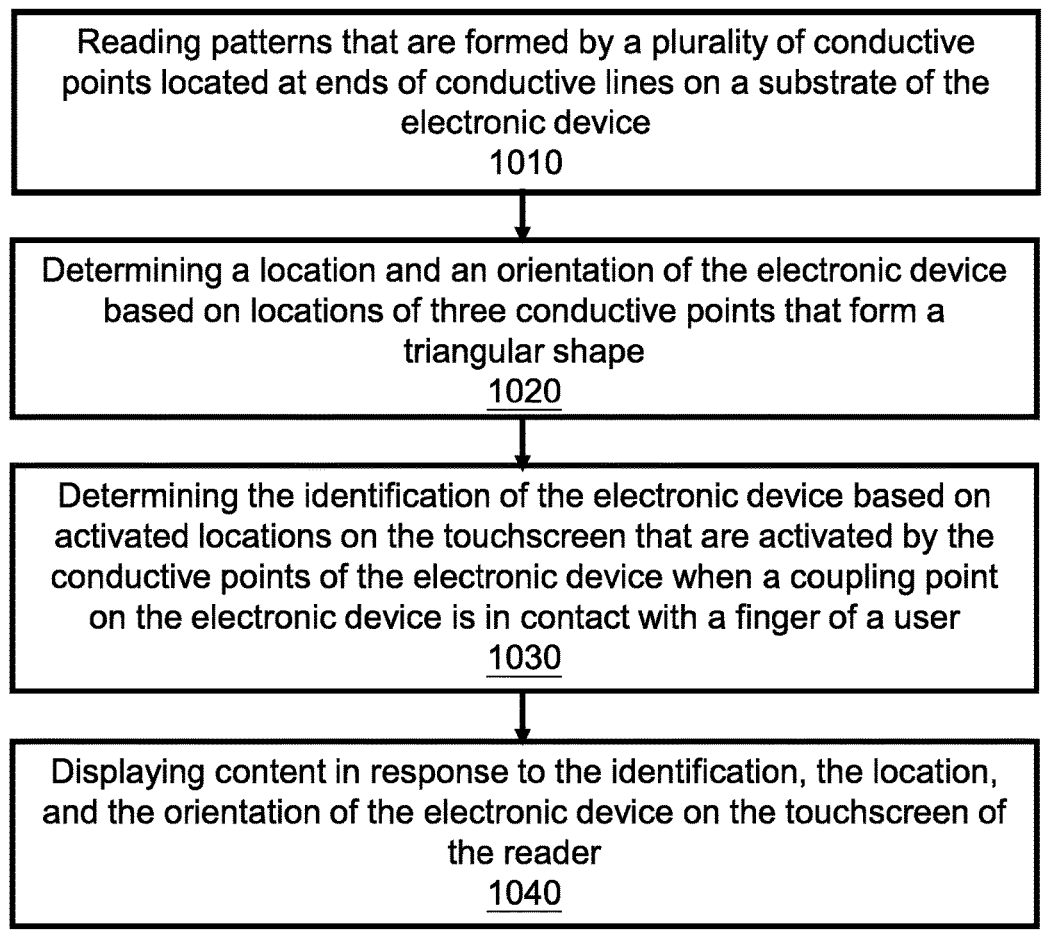
FIG. 10 shows a method executed by a reader to determine an identification of an electronic device in accordance with an example embodiment.

FIG. 10 shows a method executed by a reader to determine an identification of an electronic device in accordance with an example embodiment.

Block 1010 states reading patterns that are formed by a plurality of conductive points located at ends of conductive lines on a substrate of the electronic device.

Consider an example in which an electronic device or a card includes a non-conductive substrate with a plurality of electrically conductive points embedded in the substrate. The conductive points electrically connect to a coupling point through electrically conductive lines or traces. When the electronic device is located on or near a touchscreen of a reader, the conductive points on the electronic device activate locations on the touchscreen of the reader such that the reader reads the pattern formed by the conductive ports. The conductive points activate a group or series of coordinate locations on the reader that the reader detects and reads.

Block 1020 states determining a location and an orientation of the electronic device based on locations of three conductive points that form a triangular shape.

By way of example, three of the conductive points on the electronic device form a triangular shape to function as anchor points for the electronic device. When the electronic device is placed on the touchscreen of the reader, the reader detects locations of the three conductive points and determines a location and an orientation of the electronic device based on the locations of the three conductive points, which are anchor points.

In one example embodiment, the three anchor points are designed to form a specific triangular shape with a predetermined length for each of the three sides of the triangle. For example, if there are N conductive points on the electronic device, there will $N(N-1)(N-2)/6$ triangles that can be formed by connecting any three of the conductive points. The spatial arrangement of the conductive points on the electronic device is designed such that any other triangles formed by the conductive points on the electronic device do not have the same length and angles as the triangle formed by the three anchor points. More specifically, for each possible triangle formed by any three conductive points that are not the anchor points, the length of each side and angles between the sides need to fall in a tolerance range of numbers, which are different than the dimension of the triangle formed by the anchor points. By having this spatial arrangement of the conductive points, the reader searches for three anchor points that forms a specific triangular shape, and determines a location and an orientation of the electronic device based on locations of the three anchor points that form the specific triangular shape.

Block 1030 states determining the identification of the electronic device based on activated locations on the touchscreen that are activated by the conductive points of the electronic device when a coupling point on the electronic device is in contact with a finger of a user.

As one example, the electric field at coordinates of the touchscreen of the reader that are in contact with the conductive points is changed such that a pattern recognizer recognizes the pattern formed by the conductive points of the electronic device and determines the identification of the electronic device.

By way of example, a user places his/her finger on the coupling point of the electronic device to activate information transmission between the electronic device and the reader. Locations on the touchscreen of the reader that are oppositely disposed from all of the conductive points on the electronic device are activated, when the electronic device is located on the touchscreen.

Consider an example in which a plurality of conductive points activate a plurality of X-Y grid locations on the touchscreen of the reader. A controller receives these activated grid locations and retrieves (e.g., from a lookup table or other memory) an identification of the electronic device based on which grid locations were activated. This identification can also be based on which grid locations were not activated.

In one example embodiment, the reader neglects a false location on the touchscreen when the false location is activated by none of the conductive points on the electronic device. A processor in the reader executes an algorithm stored in memory to determine whether a detected location on the touchscreen is false. As one example, the determination is made by checking whether a group of predetermined locations on the touchscreen of the reader detect any conductive points from the electronic device. The identification of the electronic device is then determined based on the activated locations on the touchscreen that are activated by the conductive points of the electronic device.

In one example embodiment, the conductive points that are connected with the coupling point form a pattern that represents an identification of the card. The pattern is changeable when one or more of the conductive points disconnect from the coupling point. For example, breaking or shorting one of the conductive lines that connects one of the conductive points with the coupling point leads to a disconnection of the corresponding conductive point from the coupling point. The identification of the card is therefore changed when the pattern formed by the conductive points is changed. The reader reads different identifications from the same electronic device before one or more of the conductive lines are disconnected and after one or more of the conductive lines are disconnected.

The lines or traces can be permanently or temporarily disconnected or connected mechanically or electrically via physical severance, or with mechanical or electrical switches.

Block 1040 states displaying content in response to the identification, the location, and the orientation of the electronic device on the touchscreen of the reader After the electronic device is identified by the reader, a controller of the reader retrieves information associated with the identification. For instance, the touchscreen of the reader displays one or more images associated with the identification of the electronic device. The location and the orientation of the electronic device relative to the reader is displayed on the touchscreen of the reader in a form of a boundary of the card.

Figure 11:
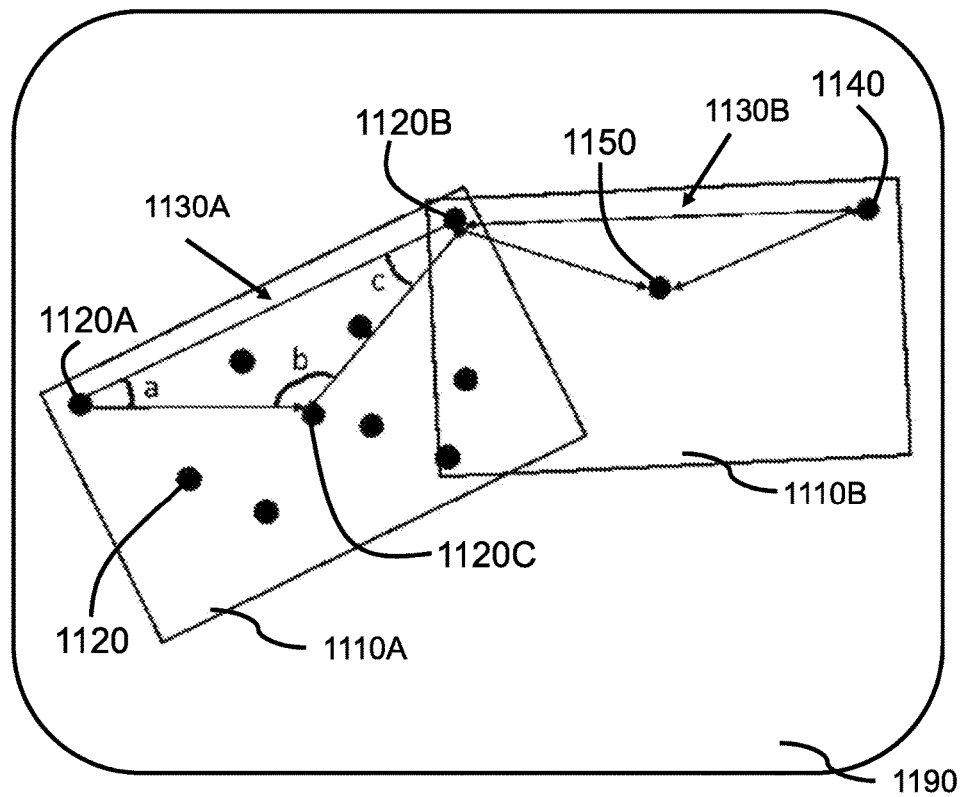
FIG. 11 shows a method executed by a reader to determine a location and an orientation of an electronic device in accordance with an example embodiment.

FIG. 11 shows a method executed by a reader to determine a location and an orientation of an electronic device in accordance with an example embodiment.

The electronic device 1110A has a plurality of conductive points 1120 that activate locations on the touchscreen of the reader 1120. Three conductive points 1120A, 1120B and 1120C function as anchor points for the electronic device. The three anchor points form a specific triangular shape 1130A with angels a, b and c between its sides.

By way of example, when the electronic device 1110A is placed on the touchscreen of a reader 1190, the reader attempts to locate three anchor points from the electronic device in order to determine the location and orientation of the electronic device relative to the reader. However, two other locations 1140 and 1150 on the touchscreen may be falsely activated even though they do not correspond to any conductive points on the electronic device 1110A. Furthermore, it is possible that the two falsely activated locations 1140 and 1150, together with one of the conductive points 1120B of the electronic device 1110A, form another triangular shape 1130B that has the same sides and angles as triangle 1130A. As such, the reader reads two triangles 1130A and 1130B that have the same size but at two difference locations. The reader determines which triangle is formed by the anchor points on the electronic device by comparing a number of conductive points that are located inside a first boundary 1110A that corresponds to triangle 1130A and a second 1110B that corresponds to triangle 1130B. As one example as shown in FIG. 11, the first boundary 1110A encloses more conductive points than the second boundary 1110B. Therefore, triangle 1130A is determined to be formed by the anchor points of the electronic device, and the location and orientation of the electronic device are determined based on triangle 1130A.

Examples of the electronic device 1110A include, but are not limited to, plastic and/or electronic cards (such as credit cards, bank cards, game cards, identification cards, cards with monetary value, etc.), handheld portable electronic devices (such as smartphones, watches), wearable electronic devices (such as electronic glasses, head mounted displays, etc.), and objects with a chip or electronic circuitry.

Figure 12:
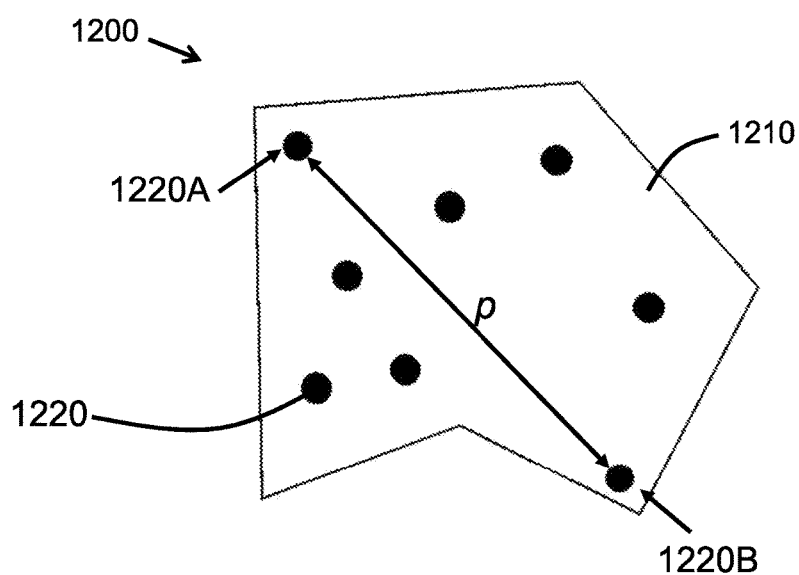
FIG. 12 shows a bottom surface of a card in accordance with an example embodiment.

FIG. 12 shows a bottom surface of a card 1200 in accordance with an example embodiment.

The card 1200 has a polygonal shape and includes a non-conductive substrate 1210 and a plurality of conductive points 1220 on a bottom surface of the non-conductive substrate 1210 of the card.

Two conductive points 1220A and 1220B form a predetermined distance p and function as anchor points for the card. Any other distances formed by any other two of the conductive points on the card are not the same as the distance formed by the conductive points 1220A and 1220B. Hence, this distance and/or location of these points provides the card with a readable and identifiable pattern in order to identify the card. When the card 1200 is placed on a touchscreen of a reader with the bottom surface of the card contacting the touchscreen of the reader, the reader searches for two anchor points that form a specific distance p. The reader determines a location and an orientation of the card based on locations of the two anchor points.

Figures 13, 14:
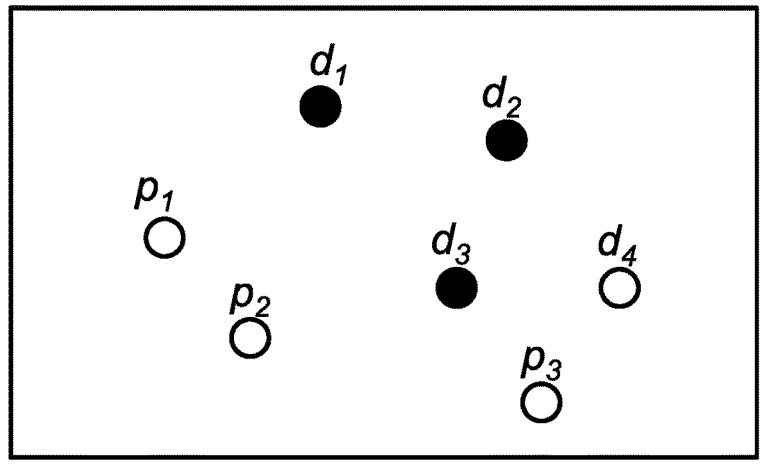
FIG. 13 shows a card with activated conductive points and deactivated conductive points in accordance with an example embodiment.
FIG. 14 is a table that shows a correspondence between datawords and codewords in accordance with an example embodiment.

FIG. 13 shows a card 1300 with activated conductive points $d_1$, $d_2$ and $d_3$, and deactivated conductive points $d_4$, $p_1$, $p_2$, and $p_3$, in accordance with an example embodiment.

Consider an example in which a card includes a substrate with a plurality of conductive points that are disposed on a bottom surface of the substrate. The conductive points electrically connect to a coupling point through conductive lines. The coupling point and the conductive lines are disposed on the top surface of the substrate (now shown in FIG. 13). When a user places his/her finger on the coupling point of the card with the bottom surface of the card contacting a touchscreen of an electronic device or a reader, the conductive points that are electrically connected with the coupling point activate locations on the touchscreen of the electronic device. As shown in FIG. 13, conductive points $d_1$, $d_2$ and $d_3$ are activated conductive points, which are connected with the coupling point, and conductive points $d_4$, $p_1$, $p_2$, and $p_3$ are deactivated conductive points, which are disconnected with the coupling point. For example, conductive points $d_4$, $p_1$, $p_2$, and $p_3$ are deactivated by breaking their conductive lines that connect them to the coupling point of the card.

In one example embodiment, the electronic device is not be able to detect all of the activated conductive points when the card is slightly curved and/or the touchscreen of the electronic device fails to detect one of the conductive points on the bottom surface of the card that faces the touchscreen of the electronic device. The electronic device executes a correction algorithm stored in its processor to determine whether a detected location on the touchscreen is inaccurately read or is false, and hence corrects the falsely detected location. The determination is made by checking whether a group of predetermined locations on the touchscreen detect conductive points from the card.

As shown in FIG. 13 for example, seven conductive points $d_1$, $d_2$, $d_3$, $d_4$, $p_1$, $p_2$, and $p_3$ are disposed on the card. Conductive points $p_1$, $p_2$, and $p_3$ function as redundant points, and conductive points $d_1$, $d_2$, $d_3$ and $d_4$ function as information points for the card. Each of the seven conductive points can be activated or deactivated by appropriate circuit wiring to connect them to or disconnect them from the coupling point.

By way of example, bit '1' represents an activated conductive point, and bit '0' represents a deactivated conductive point. Sixteen card identifications are represented by sixteen different 4-bit sequences formed by activating and/or deactivating the four information points $d_1$, $d_2$, $d_3$, and $d_4$. As one example, the bit value of each the redundant points $p_1$, $p_2$, and $p_3$ are predetermined by a correction algorithm. A rule of the correction algorithm requires: the bit value of $p_1$ to be 1 or 0 such that the sum of the bit values of $d_2$, $d_1$, $d_4$ and $p_1$ is an even number; the bit value of $p_2$ to be 1 or 0 such that the sum of the bit values of $d_3$, $d_1$, $d_4$ and $p_2$ is an even number; and the bit value of $p_3$ to be 1 or 0 such that the sum of the bit values of $d_2$, $d_3$, $d_4$ and $p_3$ is an even number. Further, the sequence of bits [$d_1$ $d_3$ $d_4$ $d_2$ $p_1$ $p_2$ $p_3$] forms a codeword while the 4-bit sequence formed by the information points [$d_1$ $d_3$ $d_4$ $d_2$] is called the dataword.

By way of example, a codeword is a sequence of bits that is produced by inputting a dataword into a mathematical function. The codeword includes more bits than the dataword and the extra bits are redundant bits derived from the dataword based on an algorithm or a formula. A correction algorithm is executed by a processor of the electronic device when the electronic device reads the codeword from the card, such that when some bits in the codeword are not read correctly, the correction algorithm can use the redundant bits in the codeword to identify and correct the bits that are incorrectly read.

An example sequence is shown in FIG. 13 where [$d_1$ $d_3$ $d_4$ $d_2$ $p_1$ $p_2$ $p_3$] forms a codeword of [1 1 0 1 0 0 0], and [$d_1$ $d_3$ $d_4$ $d_2$] forms a dataword of [1 1 0 1]. If $d_3$ is falsely read by the electronic device as 0 instead of its real bit value of 1, the correction algorithm of the electronic device will detect the error by testing the rule described above. By testing the rule, the electronic device finds the sum of the bit values of $d_3$, $d_1$, $d_4$ and $p_2$ is not an even number, and the sum of the bit values of $d_2$, $d_3$, $d_4$ and $p_3$ is not an even number, both failing the test. On the other hand, the sum of the bit values of $d_2$, $d_1$, $d_4$ and $p_1$ is an even number, which passes the test. Based on the result of the test, the electronic device determines that the bit value of $d_3$ is false and corrects it from 0 to 1.

FIG. 14 is a table 1400 that shows a correspondence between datawords and codewords in accordance with an example embodiment. The second column shows the corresponding codewords for the datawords shown in the first column. The fourth column shows the corresponding codewords for the datawords shown in the third column.

As discussed in FIG. 13, bit '1' represents an activated conductive point, and bit '0' represents a deactivated conductive point. By way of example, [$d_1$ $d_3$ $d_4$ $d_2$] with a sequence of [1 1 0 1] as shown in FIG. 13 is one of the sixteen different 4-bit sequences formed by the four information points $d_1$, $d_2$, $d_3$, and $d_4$. The first and third columns of table 1400 show the sixteen datawords formed by 4-bit sequences. Three redundant bits $p_1$, $p_2$, and $p_3$ are added to each of the datawords to form a codeword [$d_1$ $d_3$ $d_4$ $d_2$ $p_1$ $p_2$ $p_3$] for each of the datawords, as listed in the second and fourth columns. The bit values of $p_1$, $p_2$, and $p_3$ in each of the codewords is preset such that the sum of the bit values of $d_2$, $d_1$, $d_4$ and $p_1$ is an even number, the sum of the bit values of $d_3$, $d_1$, $d_4$ and $p_2$ is an even number, and the sum of the bit values of $d_2$, $d_3$, $d_4$ and $p_3$ is an even number. As shown in the table, the codeword for dataword [1 1 1 0] is [1 1 1 0 0 1 0], and the codeword for dataword [0 0 0 1] is [0 0 0 1 1 0 1], etc.

The correction algorithm discussed herein increases the information transmission reliability from the card to the reader. If one of the bits of the dataword is incorrectly detected by the reader, for example, an activated conductive point that is connected with the coupling point of the card is falsely detected as 0 by the reader, or a deactivated conductive point that is not connected with the coupling point of the card is falsely detected as 1 by the reader, the correction algorithm of the reader can identify the location of the wrong bit in the codeword and correct it accordingly. After the pattern formed by the information points that are connected with the coupling point of the card is determined by the reader, a controller of the reader retrieves information associated with the identification of the card. For instance, the touchscreen of the reader displays one or more images associated with the identification of the card. The location and the orientation of the card relative to the reader are also displayed on the touchscreen of the reader.

One of ordinary skilled in the art will appreciate that other forward error correction algorithms such as block codes, convolution codes, product codes and space-time codes can be implemented accordingly to improve the reliability of the information transmission from the card to the reader.

Example embodiments are not limited to activating the one or more coupling points with a finger, thumb, or hand of a user. By way of example, a coupling point can also be activated with a stylus pen, conducting gloves, other parts of the human body and/or other materials that by itself can activate a touchpoint on capacitive touchscreens.

One of ordinary skilled in the art will appreciate that the card of example embodiments includes various shapes and can be embodied or included with various types of electronic and non-electronic devices. By way of example, the card can be shaped as a flat or planar card, such as a business card, credit card, gaming card, or other handheld card. As another example, the card can be included with or embedded in product, such as embedded in a smartphone, embedded in a toy, attached to a cover or case, woven into a fabric of an article of manufacture, etc. As yet another example, the card can have various sizes and shapes, such as being curved or bent or foldable.

Example embodiments are not limited to activating locations on a touchscreen display of an electronic device such as smartphones or tablet screens. By way of example, a touchscreen includes a device or structure with a touch surface and the touch surface can be activated by a card with conductive points. As one example, the touch surface is coated with electrically conductive materials. A plurality of electrodes are attached to the conductive materials to sense the position of a finger touch based on electric field tomography.

As used herein, a "conductor" is an object or type of material that allows the flow of electricity. Examples of a conductive material include, but are not limited to, copper, silver, gold, aluminum, zinc, nickel, brass, conductive ink, and other conductive material (such as other metals, graphite, polymers, and semiconductors).

As used herein, a "monetary value" is an amount that may be applied to the purchase of goods and/or services. The monetary value may be more, less or equal to the amount paid for the card and may be positive or negative. The monetary value can be updated to reflect a transaction or other events.

As used herein, a "dataword" is a sequence of bits that carries information that includes, but is not limited to, an identification.

As used herein, a "codeword" is a sequence of bits including bits that carry information and redundant bits.

As used herein, a "redundant point" is an extra conductive point on a card or an electronic device that includes a plurality of conductive points. The redundant point corrects error from other conductive points on the card.

As used herein, a "redundant bit" is an extra bit in a sequence of bits that corrects error related to other bits in the sequence of bits.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

What is claimed is:

1. A card, comprising:
    an non-conductive substrate with a top surface and a bottom surface;
    a coupling point that is electrically conductive and disposed on the top surface of the non-conductive substrate;
    a plurality of conductive lines each having a first end and a second end and disposed on the top surface of the non-conductive substrate, each conductive line electrically connecting with the coupling point at the first end of the conductive line;
    a plurality of vias that extend through the non-conductive substrate from the top surface to the bottom surface; and
    a plurality of conductive points disposed on the bottom surface of the non-conductive substrate to form a pattern that represents an identification of the card, each conductive point connects with the second end of one of the conductive lines through the vias to electrically connect to the coupling point and to activate locations on a touch surface of a device,
    wherein at least three of the conductive points form a predetermined shape such that the electronic device determines a location and an orientation of the card based on locations of the at least three of the conductive points when the card is placed on the touch surface of the device.

2. The card of claim 1, wherein the conductive points activate locations on the touch surface of the device when the conductive points are in contact with the touch surface and the coupling point is in contact with a finger of a user for a predetermined time.

3. The card of claim 1, wherein the pattern formed by the conductive points is shaped as polygon.

4. The card of claim 1, wherein the pattern formed by the conductive points is shaped as one of a square, a circle, a triangle, and a star.

5. The card of claim 1, wherein three of the conductive points form a triangular shape such that the electronic device determines the location and the orientation of the card based on locations of the three conducive points when the card is placed on the touch surface of the device and the coupling point is in contact with a finger of a user.

6. The card of claim 1, wherein the pattern formed by the conductive points corresponds to the identification of the card, and the identification of the card is determined by the electronic device when a number of the conductive points activate locations on the touch surface of the device.

7. The card of claim 1, wherein one or more of the conductive points on the card function as redundant points such that the electronic device detects, based on whether the redundant points activate locations on the touch surface, a false location on the touch surface that is not activated by the conductive points of the card.

8. The card of claim 1, wherein the identification of the card is changed by disconnecting or connecting one or more of the conductive points with the coupling point.

9. A method executed by a reader to determine an identification of an electronic device when the electronic device is in contact with a touchscreen of the reader, the method comprising:
    reading, by the reader, patterns that are formed by a plurality of conductive points located at ends of conductive lines on a substrate of the electronic device;
    determining, by the reader, a location and an orientation of the electronic device relative to the reader based on locations of three conductive points that form a triangular shape;
    determining, by the reader, the identification of the electronic device based on activated locations on the touchscreen that are activated by the conductive points of the electronic device when a coupling point on the electronic device is in contact with a finger of a user; and
    displaying, by the reader and on the touchscreen of the reader, content in response to the identification, the location, and the orientation of the electronic device.

10. The method of claim 9 further comprising:
    changing the identification of the electronic device by disconnecting or connecting one or more of the conductive lines with one or more of the conductive points.

11. The method of claim 9 further comprising:
    correcting, by the reader and based on a correction algorithm, a falsely detected location on the touchscreen of the reader,
    wherein the correction algorithm is executed by a processor of the reader to determine whether a detected location on the touchscreen is false by checking whether a group of corresponding predetermined locations on the touchscreen detect conductive points from the electronic device.

12. The method of claim 9 further comprising:
    retrieving, by the reader, a first identification of the electronic device upon reading a first pattern formed by the conductive points in connection with the coupling point; and
    retrieving, by the reader, a second identification of the electronic device upon reading a second pattern formed by the conductive points in connection with the coupling point with one of the conductive lines being disconnected.

13. The method of claim 9 further comprising:
    activating, by the electronic device, locations on the touchscreen of the reader that are oppositely disposed from all of the conductive points on the electronic device when the coupling point of the electronic device is in contact with a user and the electronic device is located on the touchscreen.

14. The method of claim 9 further comprising:
    neglecting, by the reader and based on an algorithm that is stored in the reader, a false location on the touchscreen when the false location is activated by none of the conductive points on the electronic device; and
    determining, by the reader, the identification of the electronic device based on activated locations on the touchscreen that are activated by the conductive points of the electronic device.

15. The method of claim 9 further comprising:
    reading, by the reader, two or more different triangles when the reader attempts to read the conductive points of the electronic device;
    determining, by the reader, a number of conductive points that are located inside a boundary of a size of the electronic device; and
    determining, by the reader and based on the number of conductive points that are located inside the boundary of the size of the electronic device, that one of the two or more different triangle is correct.

16. A method executed by an electronic device with a touchscreen to obtain information from a card that carries the information in a pattern formed by a plurality of conductive points connecting with a coupling point through conductive lines, the method comprising:

detecting, with the electronic device and when the coupling point of the card is in contact with a finger of a user and the card is in contact with the touchscreen, a plurality of locations on the touchscreen that are in electrical contact with the conductive points of the card;

correcting, by the electronic device, a falsely detected location on the touchscreen based on a correction algorithm;

reading, by the electronic device, the pattern that is formed by the conductive points that are electrically connected to the coupling point through the conductive lines on the card; and obtaining, by the electronic device and from the card, the information that is carried by the pattern formed by the conductive points on the card.

17. The method of claim 16 further comprising:

determining, by the electronic device, a location and an orientation of the card relative to a location of the touchscreen of the electronic device based on locations of at least two predetermined conductive points and a distance between the at least two predetermined conductive points that are electrically connected with the coupling point; and displaying, by the electronic device and on the touchscreen of the electronic device, the location and the orientation of the card.

18. The method of claim 16, wherein the conductive points on the card activate locations on the touchscreen of the electronic device and one or more of the conductive points function as redundant points such that the electronic device determines, based on whether the redundant points activate locations on the touchscreen, a false location on the touchscreen that is not activated by the conductive points of the card.

19. The method of claim 16, wherein the correction algorithm is executed by a processor of the electronic device to determine whether a location on the touchscreen fails to be activated by the conductive points of the card by checking whether a group of predetermined locations on the touchscreen detect conductive points from the card.

20. The method of claim 16, wherein the correction algorithm is executed by a processor of the electronic device to determine whether an activated location on the touchscreen is false by checking whether a group of predetermined locations on the touchscreen detect conductive points from the card.

\* \* \* \* \*